United States Patent [19]

Lanphere et al.

[11] 3,740,882

[45] June 26, 1973

[54] COMBINATION SIGN BOARD AND TRUCK REMOVABLE WALL

[75] Inventors: Ralph C. Lanphere; Robert L. Elton, Racine, both of Wis.

[73] Assignee: J. I. Case Company, Racine, Wis.

[22] Filed: May 10, 1971

[21] Appl. No.: 141,786

[52] U.S. Cl. ............................................. 40/129 C
[51] Int. Cl. ............................................. G09f 7/00
[58] Field of Search .................... 40/125 H, 125 K, 40/125, 158, 125 R, 129 R, 129 L; 296/36

[56] References Cited
UNITED STATES PATENTS

| | | | |
|---|---|---|---|
| 189,903 | 4/1877 | Quarry | 40/158 |
| 1,135,826 | 4/1915 | McDermott | 296/36 |
| 1,695,106 | 12/1928 | Johnson | 40/125 K |

FOREIGN PATENTS OR APPLICATIONS

| | | | |
|---|---|---|---|
| 9,663 | 6/1890 | Great Britain | 40/129 R |
| 592,373 | 9/1947 | Great Britain | 40/125 K |

Primary Examiner—Robert W. Michell
Assistant Examiner—Wenceslao J. Contreras
Attorney—Arthur J. Hansmann

[57] ABSTRACT

A combination sign board and truck removable wall for use on a truck bed where the walls have stakes and are insertable into holes around the periphery of the bed. The sign board is mounted on the truck removable wall and has a frame extending around the board for protecting the board from damage due to the throwing of the combinad board and wall off the truck and onto the ground. Also, the assembly has the truck bed insertable stakes affixed to the combined board and wall so that the entire assembly can be handled as a unit, but the sign itself is affixed in a removable manner so that it can be changed. The entire assembly provides for a protected sign and it also provides for a structurally reenforced type of removable wall.

3 Claims, 5 Drawing Figures

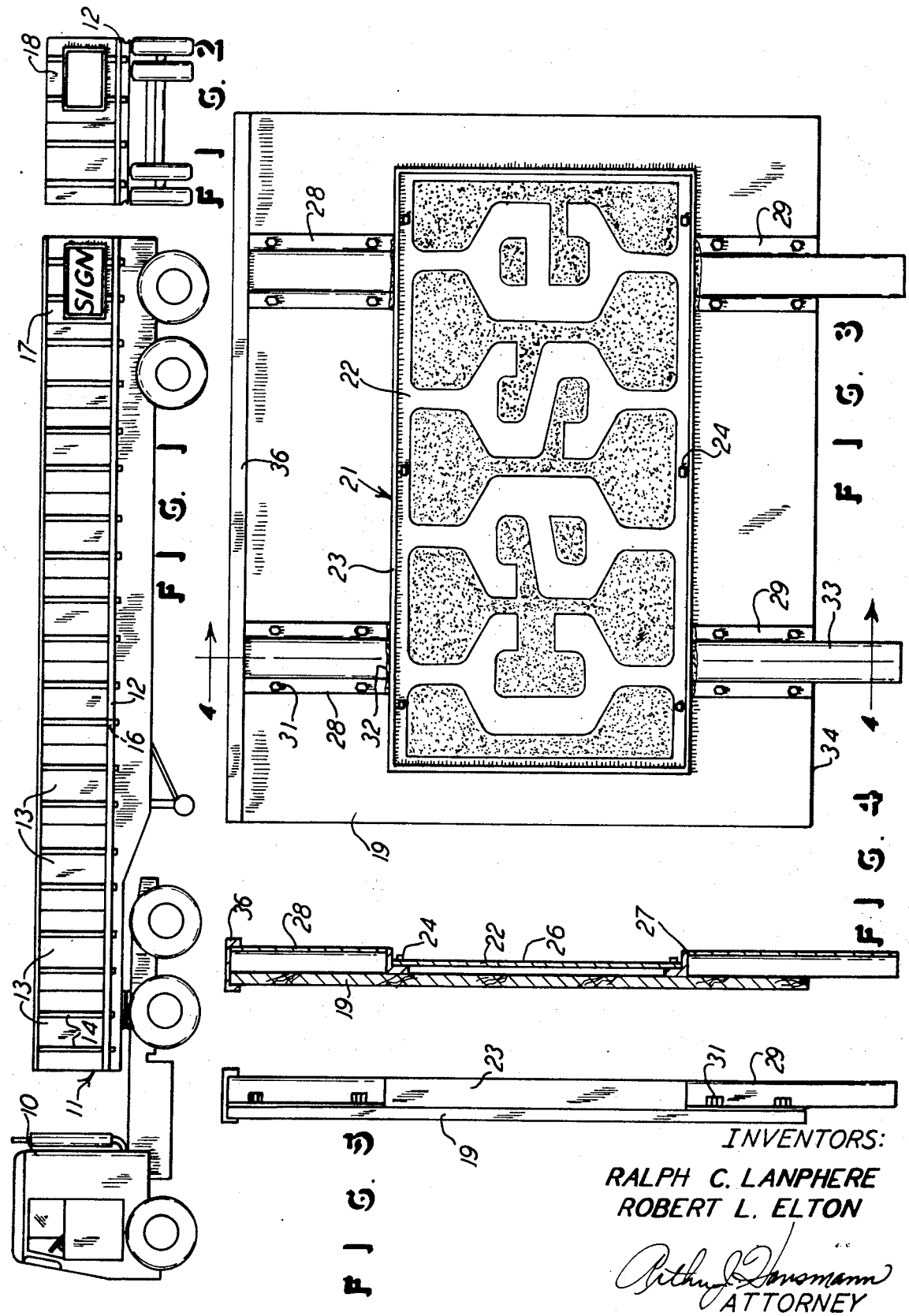

COMBINATION SIGN BOARD AND TRUCK REMOVABLE WALL

COMBINED SIGN BOARD AND TRUCK REMOVABLE WALL

This invention relates to a sign board and truck removable wall of the type insertable into the openings in the bed of a truck.

BACKGROUND OF THE INVENTION

The prior art commonly utilizes truck removable walls which have upright stakes for inserting the walls into openings in the bed of the truck. The truck may be a flat bed, drop bed, or other type of truck which does not have fixed upright walls extending around the periphery of the bed. Thus these walls are commonly removable from the bed and are positioned on the bed to restrain the load being carried on the bed. Such prior art truck removable walls are shown on the truck bed in the left end of FIG. 1, that is, toward the front of the truck bed. These walls have the wall panel uprightly positioned and these walls are held in the upright position by stakes which extend vertically along the outside of the wall, as shown in the left-hand side of FIG. 1.

The problem confronting the industry is in relation to positioning a sign on this type of truck removable wall. Several choices are possible, such as having the sign extend only between two adjacent stakes, but the sign is then recessed between the stakes and is not well presented from a visibility standpoint. Another solution of the problem could be to have the sign attached across the outer surfaces of the stakes, but, then the sign is exposed to exterior objects and is therefore subject to being damaged, one such common instance of exposure is when the truck driver or material handling men remove the side wall and throw or drop it onto the ground. If and when the sign is exposed by having it to the outside of the wall stakes, the sign is damaged and loses its function of conveying the message on the sign.

Accordingly, it is a general object of this invention to provide a combined sign board and truck removable wall which provides a sturdy wall and which at the same time accommodates a sign in a protected manner.

Another object of this invention is to provide a combined sign board and truck removable wall wherein the sign can be of a size which is not limited by the wall itself, and, more particularly, which is not limited by the spacing between the stakes of the wall.

Still a further object of this invention is to provide a combined sign board and truck removable wall which overcomes the aforementioned problems and which accomplishes the aforementioned objects, and which further provides for changing of the sign without structurally altering the combination board and wall itself and to permit the change to be made in a ready and easy manner.

BRIEF DESCRIPTION OF THE DRAWINGS

FIG. 1 is a side elevational view of a conventional truck with conventional side walls and with a combined sign board and removable wall of this invention.

FIG. 2 is a rear elevational view of the truck shown in FIG. 1.

FIG. 3 is a front elevational view of a combined sign board and truck removable wall of this invention and which can be used on the truck in FIG. 1.

FIG. 4 is a sectional view taken on the line 4—4 of FIG. 3.

FIG. 5 is an end elevational view of FIG. 3.

DETAILED DESCRIPTION OF THE PREFERRED EMBODIMENT

FIG. 1 shows the substantially conventional truck having a truck cab 10 and a truck trailer 11. The trailer 11 is shown to be of the flat bed type and it has a flat bed or floor 12 extending horizontally as shown and in the well-known manner. Side walls or panels 13 are removably positioned along the bed 12 in the conventional manner, and these walls 13 each have two spaced-apart stakes 14 which are received in openings in the bed floor 12. The openings themselves are not shown, but it will be readily understood by anyone skilled in the art that the openings are as indicated at 16 and they removably receive the lower ends of each of the stakes 14 so that the entire side wall 13 can be taken off the truck bed 12. When these walls 13 are removed from the truck bed 12 they are commonly thrown onto the ground, thus it will be appreciated that any sign which is attached to the wall 13 is susceptible to being obliterated and physically damaged.

A combined sign board and truck removable wall 17 is shown at the rear end of the truck bed 12, and another combined sign board and truck removable wall 18 is shown at the rear of the truck in FIG. 2.

FIG. 3 shows an enlarged view of this type of combination, and here it will be seen that a wall or panel 19 is rectilinearly shaped, and such panel is commonly made of wood. A sign generally designated 21 is shown to be of an overall perimeter less than that of the board 19, and the sign 21 is generally centrally disposed relative to the board 19 so that the board 19 is available for protecting the sign 21. The sign 21 includes a front face or board 22 and a rectilinear frame 23. The frame 23 is shown to be made of angle iron, and the board 22 is removably secured to the frame 23 by means of removable fasteners, such as the bolts 24. In the instance shown in FIG. 3, it is significant that the sign carries the word "case" which is the highly valued trademark of the assignor of this invention. That is, the assignor is an entity in industry and utilizes trucks for delivering its goods, such trucks commonly carry the assignor's trademark, and it is very important that the trademark be maintained in a readable and undamaged condition, even though it is subjected to the rough handling and trucking conditions described.

It will therefore be appreciated that the sign frame 23 projects forwardly of the plane of the sign face 26, and such projection is in the plane designated 27 in FIG. 4. Thus the forward plane of the frame 23 protects the sign face 26 if and when the entire assembly were dropped onto the ground. Also, with the removable fasteners 24, a different sign could be placed in the frame 23. A cap 36 is affixed to the top of the board 19.

Another important point is that the frame 23 is itself a rigid rectilinear piece and it is physically connected to the board 19 by and through the stake upper pieces 28 and the stake lower pieces 29. Thus the pieces 28 and 29 are secured to the board 19 by bolts or screws 31, and further, the stakes may be welded to the frame 23 by means of the weldments 32. It will of course be appreciated that the stake lower ends 33 extend below the wall lower edge 34 so that the entire assembly may be inserted into the truck bed opening 16, in the conventional manner.

With the connection between the panel 19 and sign 21 and stake pieces 28 and 29, the entire assembly is structurally sturdy and at the same time the sign itself is protected from damage and it need not be constructed so that it will fit only a limit dimension between any two of the stakes 14, nor need it be positioned on the outer surfaces of the stakes 14 and thus be in an exposed position and likely to be damaged.

In conclusion, the inventors of this invention were confronted with the problem of positioning the sign on the truck of the type described but yet not having the sign hidden by parts of the truck or have it exposed to damage. In searching the industry for a solution of the problem, the inventors could not find any answer in the prior art, nor could they find any commercially available product which would solve the problems. Accordingly, they conceived of the invention described herein, and the resulting product has been found to be highly satisfactory for the solution to the problem and for the purposes mentioned.

What is claimed is:

1. A combination sign board and truck removable wall for use on the bed of a truck arranged with openings for insertably receiving removable walls, comprising a truck bed removable wall, a sign board having a front face with a message thereon, a frame extending around the perimeter of said sign board and fully encircling said perimeter and extending to a plane beyond said front face of said sign board for protecting the message on said front face from marking due to dropping said sign board onto the ground, the perimeter of said sign board being less than the perimeter of said removable wall, said sign board being centrally mounted on said removable wall for protecting said frame from damage due to dropping said wall with said sign board onto the ground, and stakes attached to said frame and in separate pieces both above and below said frame and are attached to said frame to have said frame structurally re-enforce said removable wall, and with said pieces extending from said frame along said removable wall and beyond the edge of said removable wall for insertion into said truck bed opening to removably position said removable wall with said sign board in an upright position on said truck bed.

2. The combination sign board and truck removable wall as claimed in claim 1, wherein said stakes and said frame extend to approximately the same said plane parallel to said front face of said sign board.

3. The combination sign board and truck removable wall as claimed in claim 1, wherein said frame extends laterally beyond the upright position of said stakes and between said pieces thereof and is in contact with said removable wall.

* * * * *